INVENTORS.
CORNELIUS C. PERKINS.
BY DAYTON W. FITZER.

ATTORNEY.

United States Patent Office 3,533,078
Patented Oct. 6, 1970

3,533,078
KEYBOARD ENTRY CONTROL APPARATUS
Cornelius C. Perkins, Birmingham, and Dayton W. Fitzer, Dearborn Heights, Mich., assignors to Burroughs Corporation, Detroit, Mich., a corporation of Michigan
Filed Dec. 4, 1967, Ser. No. 687,610
Int. Cl. G06f 3/02, 3/04, 11/00
U.S. Cl. 340—172.5                    7 Claims

ABSTRACT OF THE DISCLOSURE

Electronic accounting apparatus of the serial step, stored program type including logic control means responsive to program instructions for controlling the type and magnitude of information which may be entered via a keyboard. In accordance with the preferred embodiment logical circuitry responsive to programmable instructions determines the type of information, i.e., numerical or alphanumeric, which may be entered by the operator when the keyboard is released upon program instruction. The logical control circuitry determines both the type of information which may be entered by an operator and the magnitude, i.e., the number of characters or value, of such information.

BRIEF DESCRIPTION

Figure 1:
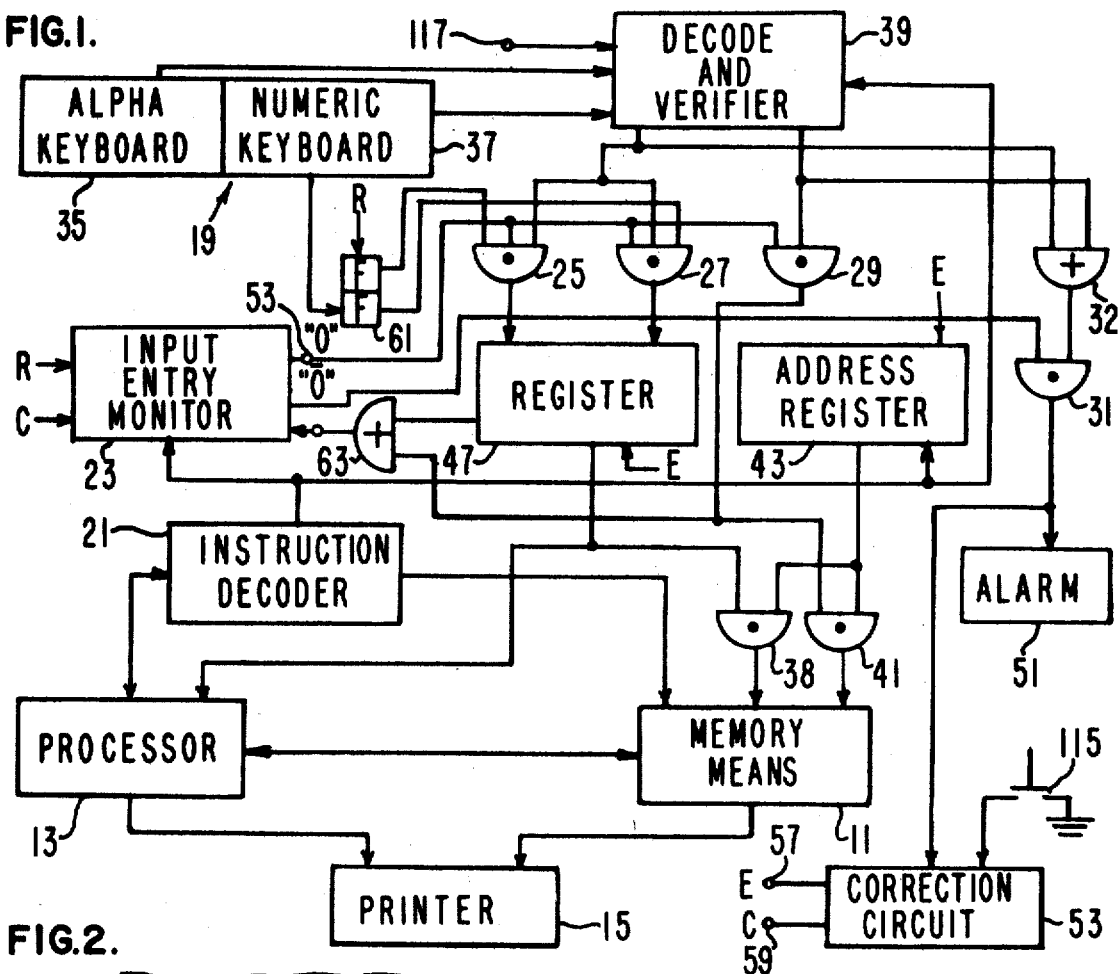

This invention relates to serial program step electronic accounting apparatus and more particularly to improved electronic accounting apparatus wherein program instruction responsive logic circuitry controls the type and magnitude of information which may be entered by an operator from a keyboard.

BACKGROUND

As is known in the art it is often desirable in the operation of computers, data processors, accounting machines and the like to allow an operator to enter information at various points in the program. To accomplish may accounting tasks alphabetic descriptive information in addition to the usual numerical information is often required. One of the simplest and most direct methods of entering such alphabetic information into the processing apparatus is to employ a typewriter console as an input device.

With the typewriter console input device for the computational system, the keyboard may be released to the operator at those times when it is desirable to have additional numeric or alphanumeric information entered during a particular operational application. With the keyboard released to the operator, the operator may make such entries at the proper time. This method of releasing the keyboard to the operator and relying upon the operator to enter the information appropriately has not been total satisfactory particularly in stored program machines. In stored program data processing machines where the normal program steps are automatically accomplished before and after the operator completes the entry of the information, it is desirable to assure that such information is correctly entered by the operator. If such information is not entered properly the entire program operation from the entry of the operator of the erroneous information may be inaccurate or totally wrong due to the errors entered into the program by the operator. Thus the task processing efficiency of such computers, electronic accounting apparatus and the like, is dependent upon the accuracy with which an operator enters the information from a keyboard.

It is therefore an object of the present invention to control the type of information which may be entered into a data processing apparatus by an operator.

It is a further object of the present invention to provide program instruction responsive logic circuitry for determining the type and magnitude of information which may be entered into electronic accounting apparatus from from a keyboard.

It is yet a further object of the present invention to increase the accuracy of information entered into electronic accounting apparatus via an operator controllable keyboard.

It is yet a further object of the present invention to increase the task processing efficiency of operator controllable electronic accounting apparatus.

It is a still further object of the present invention to enable the programmer to determine the type and quantity of information which may be entered into electronic apparatus via an operator controllable keyboard.

DETAILED DESCRIPTION

In accomplishing the above objects and other desirable aspects applicants have invented novel logical control apparatus responsive to a programmable instruction for limiting the type and magnitude of information which may be entered into electronic accounting apparatus via an operator controllable keyboard. In accordance with applicants' invention a programmable instruction presets a particular count into an entry control counter. The counter actuates logic control gates which permit information to be entered into the electronic accounting apparatus via the keyboard. Both the type of information, i.e., alpha or numeric, and the magnitude of such information may be specified by the programmable keyboard instructions. Each keyboard entry decrements the count in the entry counter thereby providing a running count or tally of the information which may be entered. After the counter has been counted down to a predetermined number, for example zero, the gates are disabled so that no additional information can be entered. In the event the operator enters information which is not in accordance with the program instruction, applicants' control circuitry, in accordance with another aspect of the present invention, signals the operator that an error has been made and initiates an error routine.

For a more complete understanding of applicants' invention reference may be had to the following detailed description in conjunction with the drawings wherein:

FIG. 1 is a logical block diagram of keyboard entry control apparatus embodying the principles of the present invention.

Figure 2:
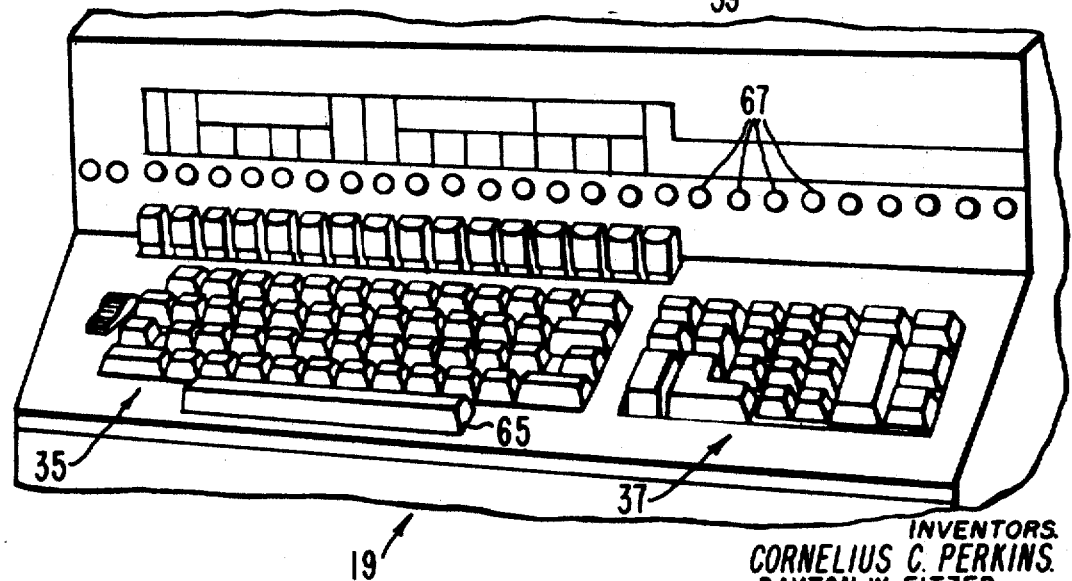
Figure 3:
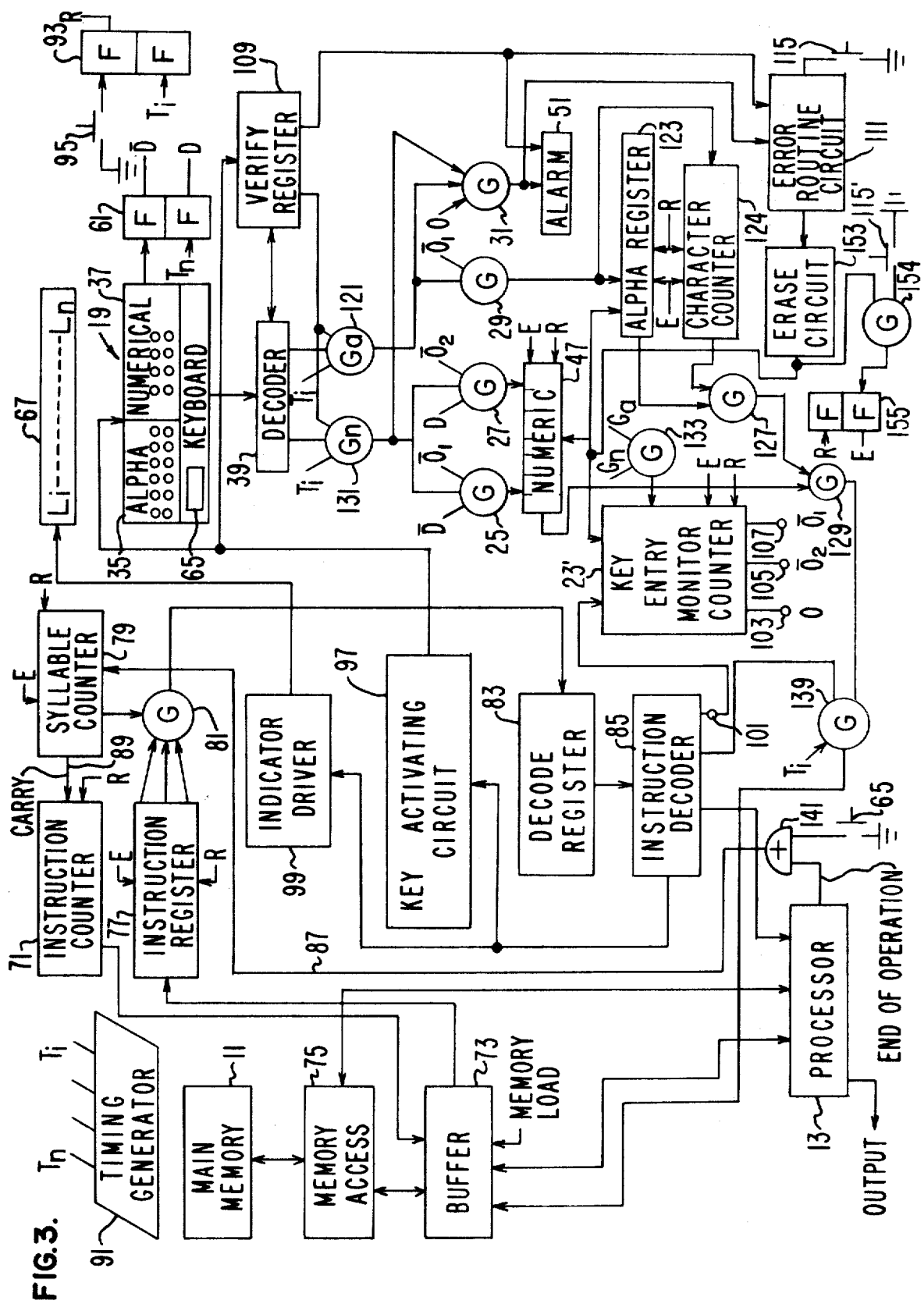
Figure 4:
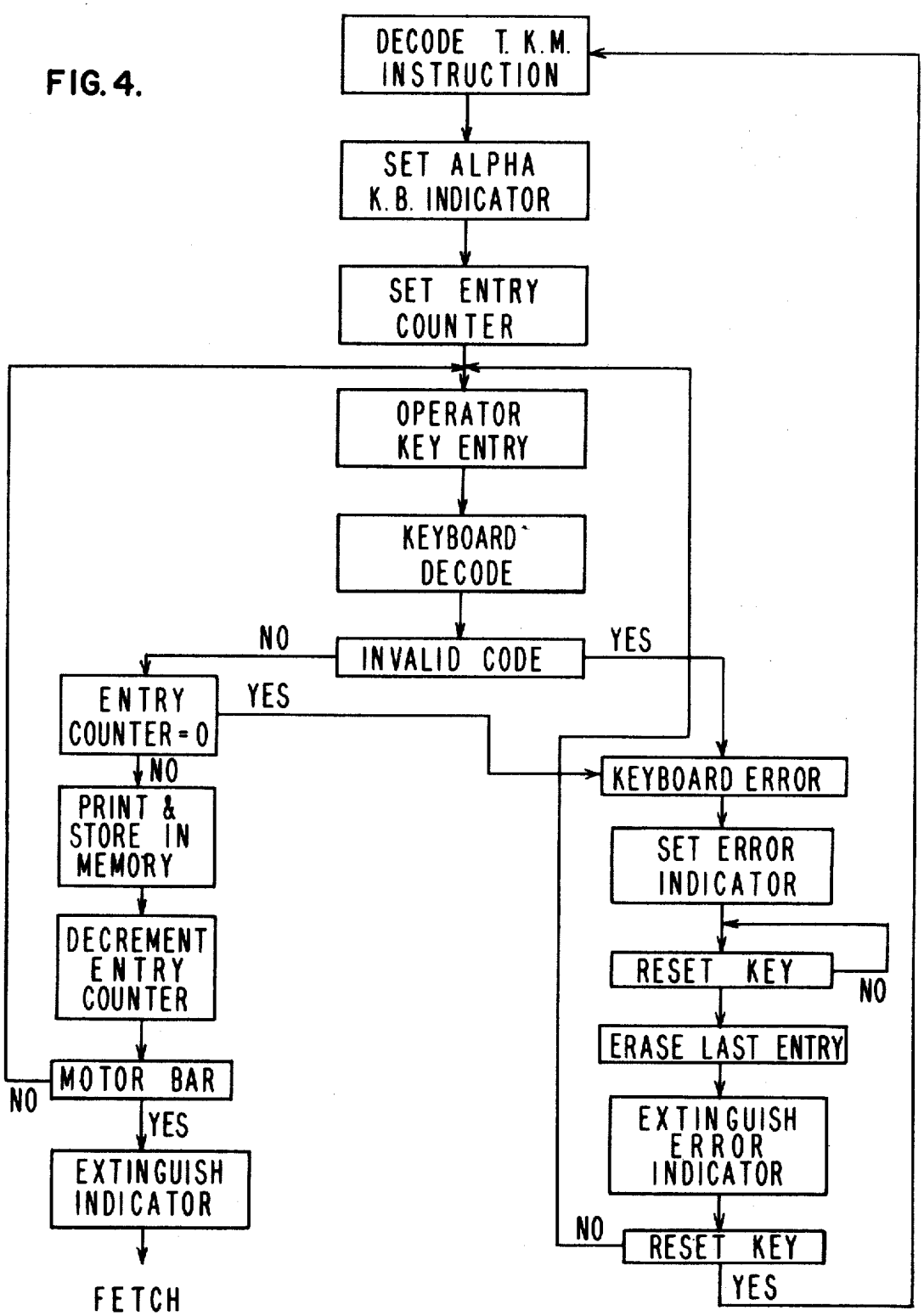
Figure 5:
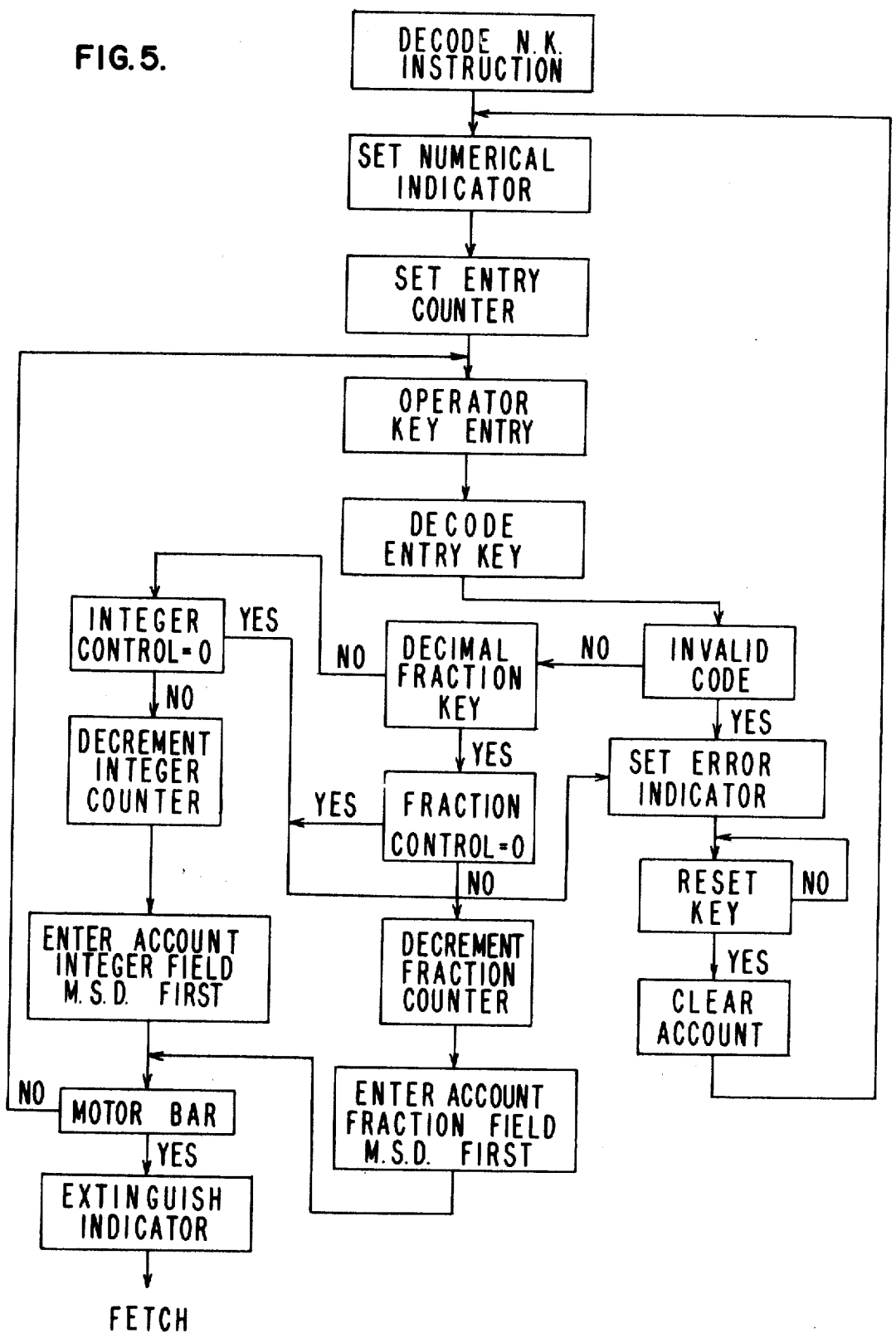

FIG. 2 illustrates a keyboard of an electronic accounting apparatus utilizable in accordance with the principles of the present invention, FIG. 3 illustrates a logical block diagram of serial program step electronic accounting apparatus embodying the principles of the present invention, FIG. 4 illustrates a logic flow diagram of the steps for controlling the entry of alphabetical information in accordance with the principles of the present invention, FIG. 5 illustrates a logical flow diagram of the steps for controlling the entry of numeric information in accordance with another aspect of the principles of the present invention.

Referring now to FIG. 1 there is shown a logical block diagram of the keyboard entry monitor apparatus in accordance with the preferred embodiment of principles of the present invention. As is hereinafter to be more fully explained, the preferred embodiment of the applicants' keyboard entry monitor apparatus operates in conjunction with a serial program step electronic processing apparatus. Information and object data are recorded and stored in the memory 11. The information stored in the memory is subsequently transferred to and manipulated by a processor 13 under the control of the successive program steps. An appropriate output from the processor 13 is generated on any apparatus, for example, a printer 15. The information and program data may be entered, for example, either from a tape reader via the memory load terminal 17 or from a keyboard console 19. In accordance with the principles of the present invention the information which an operator may enter into the data processing apparatus during its operation is controlled and specified by programmable instructions. During the operation of the data processing apparatus, the serial steps are sequentially withdrawn from the memory 11 into an instruction decoder 21. The instruction decoder, which may comprise any type known in the art, for example a diode matrix decoder, generates appropriate logic signals in response to the particular program instructions withdrawn from the memory for controlling the processor 13 and memory for withdrawing the appropriate information and manipulating it in accordance with the program steps.

When it is desirable to have an operator enter information into the electronic accounting apparatus during the processing of a task, the appropriate keyboard entry program step is designated by the programmer. In response to the decoding of the keyboard program instruction, the instruction decoder appropriately sets control information into the input entry monitor 23. The input entry monitor as hereinafter is to be more fully described may comprise an array of bistable devices arranged in a counter configuration or any elapsed timing circuit or event counter. By entering the appropriate count into the counter the operator may be limited by the program instruction as to the type and amount of information which may be entered. As shown, gates 25, 27 and 29 are controlled by a common output, for example, the non-zero, i.e., "$\bar{0}$," terminal from the input entry monitor 23, while gate 31 is controlled by the zero, i.e., "0" output terminal. The gates 25, 27, 29 and 31 may comprise any of the well known logical AND type in which all inputs must be true before an output is generated. By altering, for example by decrementing, the count of the counter 23 in response to each legitimate keyboard entry by the operator, the original control count determines the time during which the input entry monitor 23 activates gates 25, 27 and 29 and holds gate 31 inactive. When the count in counter 23 reaches a predetermined value, for example zero, it indicates that the operator has entered the maximum number of information characters designated by the program step and gates 25, 27 and 29 are inactivated and gate 31 is activated.

As shown, the keyboard 19 in accordance with the principles of the present invention comprises an alpha section 35 and a numeric section 37. As hereinafter to be more fully described the principles of the present invention permit the programmer to designate the number of alpha characters which may be entered by an operator from the keyboard at a particular stage of a program or the magnitude of numeric information which may be similarly entered. The outputs of the keyboard sections 35 and 37 are coupled to a decoder and verifier circuit 39. The operation of the respective keys of the keyboard sections may actuate an appropriate transducer, not shown, which in response to the mechanical movement of the key generates an appropriate multilevel electronic signal in accordance with a predetermined code. This code signal is coupled to a decoder circuit which, for example, may comprise an array of diodes in matrix type form. As shown, an output from the instruction decoder 21 is coupled to the input of the decoder verifier circuit 39. In this manner it is possible for the programmable keyboard instruction to designate the type, i.e., alpha or numeric information which may be entered during the particular keyboard instruction.

As hereinabove described, applicants' input entry monitor circuitry permits a programmer to designate not only the type of information which an operator may enter at a particular junction of a program but the magnitude of such information. In the case of an alpha information input instruction which releases the alpha keyboard section 35 to the operator, such an instruction may define the allowable number of alphabetical characters which may be entered. In this instance the instruction decoder 21 would set a predetermined control signal, for example a particular count, in the input entry monitor 23 which control signal would correspond to the permissible number of entries. Logical gate 29 is controlled by the state of the input monitor 23, i.e., zero or non-zero state, and thus permit the serial entry of alpha characters up to the program instruction predetermined number. After the count in input monitor reaches the predetermined count in response to the input of the particular number of alphabetical characters designated by the alphabetical input program instruction, gate 29 is deactivated thereby preventing the further entry from the keyboard. During the active status of gate 29, the information entered by the operator is coupled via gate 41 to the memory location designated by the content of program settable address register 43. After entry of the information into the memory 11, it may be utilized in any of the normal task processing operations as is hereinafter to be more fully explained.

In the case of numeric information, the programmable keyboard entry instruction in accordance with applicants' invention may designate not only the number of characters which may be entered via the numeric section 37 of the keyboard via gate 38 to memory 11 or directly to the processor 13 but the magnitude, i.e., the maximum number of digits to the left and right of a decimal point. In the manner hereinabove described in conjunction with the control of the entry of alpha information, when the numeric keyboard instruction is decoded in the instruction decoder 21 it is coupled to the input of the entry monitor 23. This same instruction or a portion thereof is coupled to the decoder verifier circuit 39 to designate that the keyboard instruction permits only numeric information to be entered. Appropriate indicator means are utilized, as hereinafter described in conjunction with FIG. 3, to indicate to the operator which portion of the keyboard is enabled or energized.

With the appropriate count set by the decoded numeric keyboard program instruction, the gates 25 and 27 are primed or energized to allow the passage of signals generated by the numeric keyboard via the decoder to a numeric buffer register 47. In specifying the permissible entries from the numeric keyboard, the programmable instruction may specify the location of a decimal point. In the preferred embodiment of applicants' invention the programmable instruction specifies the maximum numeric value and any number up to that value may be entered. For example, a typical numeric keyboard programmable instruction may designate that the number one hundred (100.00) may be entered, i.e., there may be up to three places to the left of the decimal point and two places to the right. The three integers beginning with the most significant digit are entered first into the register 47, via gate 25. Thereafter the decimal point key is operated followed by the most significant decimal values. In the event that the operator entry comprises only a fraction or decimal portion, the operator would first operate the decimal point key and thereafter enter the appropriate value. Bistable element 61, which may comprise a flip-flop, monitors the operation of the decimal point key mechanism of the numeric keyboard. The reset or normal condition of flip-flop 61 is the no decimal point condition, $\bar{D}$, which actuates gate 25, the integer gate, and deenergizes or renders inactive the gate 27 which is the decimal gate.

In the preferred embodiment of applicants' invention, the numeric keyboard instruction determines where the decimal point is to be located. For example the control signal coupled to the input entry monitor 23 from the instruction decoder 21 designates the permissible number of integers which may be entered into the numeric register 47 before the decimal key is operated. Failure to operate the decimal key at the designated time, i.e., after the entry of the maximum number of integers, would result in a keyboard error condition, as a further entry would exceed the permissible number of integers as specified by the numeric keyboard instruction.

As hereinabove discussed in conjunction with the alpha-entry control, the count of the input entry monitor 23 is decremented via gate 63 with each allowable entry. Thus the running count corresponds to the permissible number of entries and when the counter reaches a predetermined count, for example zero, then any additional attempt to enter information results in an alarm condition signifying that the operator has erroneously attempted to enter information in excess of the program designated permissible keyboard entry.

When an attempt is made by the operator to enter the wrong type of information from the keyboard or to enter information in excess of the designated quantity, applicants' logic circuitry activates alarm 51. As shown, the zero state terminal 53 of input entry monitor 23 is coupled to gate 31. Thus with the count or state of input monitor 23 in the "no entry allowable" condition, i.e., "zero" (0) state and an entry is made from either section of the keyboard, gates 31 and 32 generate output signals to activate alarm 51. As is hereinafter to be more fully explained, the error correction circuit 53 may be activated by switch 55 to allow the operator to in effect back space and correct the keyboard entry error. The signals, E and C, from the output terminals 57 and 59 of error correction circuit are utilizable to increment the count in monitor 23, i.e., to compensate for the decrement by the error entry, and to erase the last information entry in either register 47 or the address location in memory 11 designated by the address register 43.

Referring now to FIG. 2 there is shown the keyboard of an electronic accounting apparatus typical of the type utilizable in accordance with the principles of the present invention. The keyboard 19 comprises the numeric section 37 and an alphanumeric section 35. Motor bar 65 is arranged when actuated to generate an appropriate signal to terminate the keyboard entry instruction. By terminating the keyboard entry instruction in response to the operation of the motor bar by the machine operator, the operation of the data processing apparatus is returned to the serial step program as determined by the next serial program command.

An array of indicator means 67 is arranged above the keyboard to alert the operator to the active status of the various portions of the keyboard. In the preferred embodiment the keyboard instruction when decoded in the instruction decoder actuates appropriate indicator control circuitry for activating, for example, appropriate ones of a plurality of indicator lamps. With the termination of the keyboard instruction by the operation of the motor bar 65, the indicator control circuitry would be deactivated thereby extinguishing the active indicator lamps.

DATA PROCESSING APPARATUS— NORMAL OPERATION

With reference to FIG. 3 there is shown a logical block diagram of a serial program step electronic data processing apparatus incorporating keyboard entry control apparatus in accordance with the principles of the present invention. The apparatus illustrated in FIGS. 1 and 3 are similar and corresponding parts or functions are similarly designated. A main memory 11 which may comprise any apparatus for storing information in coded form, for example a core memory or magnetic disk or drum, is arranged to store program and object data. Information stored in main memory 11 is processed in accordance with the program instruction by processor 13. In operation the instruction counter 71 is normally preset at the beginning machine operation to a predetermined count. The instruction counter 71 is arranged to sequentially withdraw the program steps stored in the main memory in accordance with the count of the counter 71. In the preferred embodiment a memory word comprises a plurality of syllables, for example four. In this instance instruction counter 71 interrogates the main memory 11 via buffer 73 and memory access 75, which may be of any type known in the arts for addressing an access memory and for transferring the information read from a particular memory address to an instruction register 77. Syllable counter 79 is arranged to interrogate the instruction register 77 and to transfer via logical gating means 81 the appropriate word syllable corresponding to the count of the syllable counter 79. In this manner gate 81 transfers a selected syllable to the decoder register 83 in accordance with the count of the syllable counter 79.

The contents of the decoder register 83 generate an appropriate output signal corresponding with the contents of the decoder register and this output is coupled to the instruction decoder 85. The instruction decoder 85 which may comprise any logical decoder known in the art, for example, a diode array, generates an output signal to control the operation of the processor 13. The processor 13 which may comprise any array of any logical circuitry known in the art for accomplishing the desired logical functions, is arranged to operate on the object data in accordance with the control signals coupled to it by the instruction decoder 85.

At the end of each step or logical sequence of the processor, a signal is sent via the line 87 to the syllable counter 79. Thus the end of step signal from the processor coupled via line 87 to an input of the syllable counter 79 advances the count of the counter. In response to the increased count in the syllable counter, the next program instruction syllable is coupled from the instruction register 77 via gate 81 and transferred to the decode register 83. In this manner the decode register receives the next program step instruction and, in the manner hereinabove described, the decode register 85 generates the appropriate logical control signals to control the next step of the processor in accordance with the program. Each time the syllable counter reaches a predetermined count it generates a control or carry signal. This carry signal from a syllable counter is coupled to the instruction counter via line 89 to thereby advance the instruction counter to the next count in its orderly count sequence. The instruction counter 71 in response to each increased count or state interrogates the main memory 11 via the buffer 73 and memory access 75 to withdraw the next in the normal series of instruction words of the program as determined by the count in instruction counter 71. The instruction word is then transferred, as hereinabove described, to the instruction register 77. In accordance with the particular count of the syllable counter, gating means 81, again sequentially transfers the respective syllables of the instruction word in the instruction register to the decode register 83. Thereafter the instruction decoder 85 again generates appropriate logical control signals to control the processor in accomplishing the task indicated by the respective instruction syllables. In this manner the various sequential steps of the program are carried out thereby accomplishing the processing task and generating the appropriate output from the processor in response to the information and program data.

The program and object data may be loaded into the main memory from the keyboard 19 or from any memory load means known in the art, for example, a tape reader. As is known to those skilled in the computer art, the timing and sequencing of various ones of the various logical operations of computer type apparatus must be accurately maintained and executed. Timing generator 91 schematically illustrates circuitry for generating the necessary clock pulse timing pattern for controlling the operation of the computer apparatus illustrated in FIG. 3. This timing circuitry may be of any type well known in the art for generating cyclic timing pulse patterns for controlling and sequencing the various operations of the logical elements of the computer apparatus in accordance with a predetermined timing sequence. Similarly the various registers and bistable elements must be set to a predetermined state initially and periodically during operation. Set flip-flop 93 and switch 95 are arranged to generate an appropriate reset signal R for the various elements.

KEYBOARD ENTRY CONTROL

As hereinabove explained, the programmer in accordance with the principles of the present invention may designate the type and magnitude of information which an operator may enter from a keyboard. When it is desirable to have the machine operator enter information from the keyboard, the programmer inserts the appropriate keyboard instruction at the appropriate point in the serial step program. The keyboard instruction designates the type of information, i.e., either alphabetical or numeric, which may be entered and the magnitude or number of information characters which may be entered from the actuated or enabled section of the keyboard.

With reference to FIG. 3 in conjunction with FIGS. 4 and 5 the operation of the keyboard input control apparatus in accordance with the principles of the present invention will now be explained. FIG. 4 illustrates the logical flow diagram of the steps in accomplishing the keyboard entry control for alphabetic information. Similarly FIG. 5 illustrates the logical flow diagram of the steps in accomplishing keyboard entry control for numeric information. In accomplishing either of the keyboard entries, i.e., the alphabetical or numeric, the programmer incorporates the appropriate keyboard instruction at the desired point of the serial step program. When this keyboard instruction is transferred under the control of the syllable counter 79 from the instruction register 77 to the decoder register 83, the instruction decoder 85 actuates the appropriate section of the keyboard and enables the key activating circuit 97 and indicator driver 99. This enables the selected section of the keyboard and activates appropriate indicators to alert the machine operator. The presence of a keyboard instruction in instruction decoder 85 results in the coupling of a keyboard entry control signal from terminal 101 to the input of key entry monitor counter 23. This keyboard entry control signal preferably comprises a binary number signal corresponding in magnitude to the number of information entries which the program permits the operator to make via the keyboard. As shown the key entry monitor counter 23 generates three logical control signals at output terminals 103, 105 and 107. The logical signals at the respective output terminals is dependent upon the content or count of the monitor counter 23 at a particular time. The respective output signals appearing at the terminals 103, 105 and 107 are coupled to designated inputs of logical gates 25, 27, 29 and 31. In the manner hereinabove briefly described and to be hereinafter more fully described, the respective gates may comprise any type of the logical AND gate, well known in the art, in which an output is generated in response to the simultaneous presence of all the input signals.

Referring now to FIG. 4 in conjunction with FIG. 3 the alphabetical or type to memory instruction will be described. The presence of the alphabetical instruction in the instruction decoder 85 results in the activation of the alpha keyboard indicators by circuits 99 and 67 and the setting of the instruction-determined entry count into the entry monitor counter 23. This number corresponds to the maximum number of alphabetical characters which may be entered by the operator via the keyboard during the keyboard instruction. The operator is now free to enter information via the alpha section of the control console 19, and the signals generated in response to the actuation of the typewriter keys are coupled to a keyboard decoder circuit 39. The signals emanating from the keyboard transducer to the decoder are compared with the contents of a verify register 109 to determine that the operator has actuated the appropriate keys.

If it is determined that the operator has actuated a key which has not been designated by the active program keyboard instruction, the output from the verifier register 109 energizes the error routine circuit 111. This triggers an appropriate alam 5' to signal the operator. At this time the operator is free to actuate a reset key 115 which in effect backspaces the keyboard entry by erasing the last keyboard information entry and returns the operator to the previous point in the program. The operator is then free to make another keyboard entry. If the error occurred at a time prior to the last entry the operator is free to actuate the reset key 115' (or 115 a second time) which results in the complete erase of all information entered during the present keyboard instruction. This procedure returns the operator to the first step of the keyboard entry instruction then contained in the instruction decoder.

If the output of the keyboard 19 corresponds with the allowable keyboard input, the verify circuit registers true, i.e., no error, and the information is coupled via gate 121 to the input of gate 29. Gate 121, which is the alpha entry gate, monitors the state of the key entry counter 23 and if the entry counter is in the information entry state, i.e., in the non-zero state, then the keyboard information signal is coupled to the alpha register 123. The input characters from the keyboard may be assembled in the alpha register 123 and transferred periodically to memory 11 under the control of character counter 124. The character counter 124 monitors the number of characters entered into the alpha register via gate 121 and 29 and via gates 127, 129 and 139 controls transfer to the appropriate memory location, for example, one designed by the address register 43 (FIG. 1). After the alpha character is coupled via gate 121 to the alpha register 123, the operator is free to make the next keyboard entry. Again the keyboard entry is coupled to the decoder 39 and checked against the program designated keys to determine whether the particular entry is a valid entry. If valid, the entry is coupled to the input of gate 29 which passes the input signal to the alpha register 123 if the entry monitor counter 23' is in the non-zero, i.e., information input, state. If the entry counter is in the zero, "0," or no input state, the entry is in excess of the allowable information entries and thus the machine enters an error state. The alarm 51 is actuated by gate 31 which also has its output coupled to the error routine circuit 111. In this manner the error routine is initiated and as hereinabove described the operator is able to in effect backspace to correct the erroneous information entry.

The entry of alpha information from the keyboard may continue until the count of the entry monitor counter 23 is returned to its normal, reset state, for example, a zero binary count. Each permissible keyboard entry via gate 121 or gate 131 results in the coupling of a count down signal via gate 133 to the entry monitor counter 23. The output signal from gate 133 modifies, for example decrements, the count in the entry monitor counter 23. Whenever the count or content of the entry monitor counter 23 in response to signals from gate 133 reaches a predetermined count, for example binary zero, the logic signal levels at the output terminals 103, 105 and 107 of the input monitor counter 23 indicate that no additional information may be entered. Thus the logical gates 25, 27 and 29 are deenergized and gate 31 is energized. In this manner the information which may be entered via keyboard is controlled by the programmer by a keyboard instruction which designated the number of keyboard entries which may be made. After the total number of entries as described by a particular keyboard instruction have been entered, the logical control signal to the keyboard entry gates 25, 27 and 29 is not true, i.e., the monitor counter in the no entry state, therefore any additional entry signal from gates 121 or 131 is coupled by gate 31 to the alarm and error routing circuits.

Referring now to FIG. 5 in conjunction with FIG. 3 the control of numeric keyboard entry will now be explained. At the point in the serial program where the operator is to enter numeric information, the program numeric keyboard instruction is coupled via gate 81 to the decode register 83. With the numeric instruction in the decode register, the instruction decoder 85 actuates the appropriate indicator and keys via circuits 97 and 99 to alert the operator. Similarly the numeric instruction in the instruction decoder couples a keyboard entry control signal to the key entry monitor counter 23. This entry control signal in the key monitor circuit determines the magnitude of a numeric keyboard entry, i.e., the number of integer and fraction or decimal figures which may be entered from a numeric keyboard. By specifying the location of a decimal point in the entry control signal, the monitor counter designates the number of integers which may be entered, i.e., the significant digits to the left of the decimal point and the number of fractional or decimal digits to the right of the decimal point. This specification of the integer and decimal values by applicants' program instruction may be accomplished by setting separate numeric counts in binary form into the counter 23. Separate outputs $\overline{0_1}$ and $\overline{0_2}$ may be monitored from the counter, for example, at terminals 105 and 107 to designate the respective contents of the integer and decimal portions of the input monitor counter 23.

With the appropriate keyboard entry control signal set in the monitor counter 23 in response to the numeric keyboard instruction in the decoder and the appropriate indicator and key logic circuits 97 and 99 activated, the operator is free to enter information from the numeric section of the keyboard. As in the case of the alpha information entry control hereinabove described, the output from the keyboard is coupled to the decoder where it is checked against the contents of the verify register 109. As hereinabove described, if an invalid code or a keyboard entry error is detected, the apparatus goes into an alarm and error state. By actuating the error reset key 115, or key 115', the operator is able to clear the error by actuating limited erase circuit 153 or total erase circuit 155. The limited erase circuit 153 backspaces one place to erase the previous entry and return the operation of the machine to the previous state before the entry of the erroneous information. The total erase circuit 155 generates a signal E to totally erase all information entered during the present keyboard instruction and permits the operator to begin again.

If the entry is verified, i.e., checks with the permissible entries, the keyboard information signal is coupled via the gate 131 to the input of gates 25 and 27. The state or count of the input monitor counter determines the logical control signals coupled to the inputs of gates 25 and 27. If the input counter 23 is in the non-zero, i.e., information entry state for the integer portion of the counter then gate 25 is energized. Similarly if the decimal or fractional portion of the input counter is in the non-zero state, gate 27 is energized. With the respective inputs to gates 25 and 27 from the monitor counter 23 both in the logically true state, it is the state of the decimal key monitor circuit 61 which determines which gate is fully primed or energized. If the fractional or decimal key has not been actuated signal $\overline{D}$ (decimal point not) is true and thus the entry from the numeric keyboard is coupled via gate 25 to the integer section of numeric register 47. Conversely if the decimal point key of keyboard 19 has been operated, then signal D (decimal point) is logically true, while $\overline{D}$ is false, and thus gate 27 couples the entry of information to the decimal portion of register 47.

In the preferred embodiment, the most significant digit is entered first into the numeric register 47 and as subsequent integer entries are made the more significant digits are precessed to the left resulting in the proper numerical order. After the numeric integers have been entered into the proper positions of the numeric register, the operator, as in the alpha entry steps, has the option of actuating the motor bar, which would terminate the keyboard instructions or of returning to the operator key entry step of the flow diagram. The operation of the motor bar terminates the keyboard instruction by coupling a signal via gate 141 to increment the syllable counter 79. This returns the control of the processing apparatus to the next program instruction by withdrawing the next program instruction from the instruction register 77 and inserting it in the decode register 83, i.e., the fetch operation. Alternatively at this junction of the program, the operator is free to enter additional information from the numeric keyboard. The information signal is again decoded and verified. If the information is not designated as decimal, i.e., the decimal key has not been previously operated, the information again follows the integer path via gate 25 to the numeric register 47 assuming that the contents of the integer portion of the monitor counter 23 is not zero, $\overline{0}$. As shown, each entry from the numeric gate 131 is coupled via gate 133 to decrement the count of the entry monitor counter 23.

Assuming that the decimal key has been previously actuated, gate 25, the integer gate, is de-energized and gate 27 which is the decimal gate is energized. With the decimal key having been actuated, the signal D from flip-flop 61 is now logically true and $\overline{D}$ is logically false. With signal D true, the entry is designated to be a decimal entry. Assuming that the decimal or fraction portion of the entry monitor counter 23 is non-zero, the decimal entry is entered into the decimal or fractional field in the numeric register 47 via gate 27. The most significant digit is preferably entered first and the subsequent decimal entries are entered in the proper descending decimal position order. After each decimal or fractional entry into the numeric register 47 is complete, the operator again has the option of terminating the keyboard entry instruction by operating the motor bar 65 or of returning to the keyboard entry step. Subsequent keyboard entries would follow the logical path of the decimal or fraction entry until the allowable number of entries had been made. If the operator attempts to enter more than the prescribed number of digits, the output from the entry monitor via gate 31 signals an error routine. As before, the operator upon the occurrence of an error has the ability to backspace to correct or delete the error. After the operator has completed entry of the desired information within the bounds prescribed by the keyboard instruction, the operator actuates the motor bar 65 which terminates the keyboard instruction, extinguishes the indicators and increments the syllable counter thereby returning the processing apparatus to the program step next following the completed keyboard instruction.

While in the foregoing there is disclosed and described particular embodiments of applicants' keyboard entry logical control apparatus in conjunction with serial program step accounting apparatus, it is to be understood that the principles of applicants' invention may be applied in conjunction with other types of accounting or data processing equipment and the like. The structure and operation of the various electronic and logic circuits incorporated in the foregoing disclosure may be of any type known in the art for performing the various logical and/or control functions described. In light of applicants' disclosure it will be apparent to those skilled in the art that many variations, changes substitutions and other departures from the disclosed illustrative embodiments may be made without departing from the scope of applicants' invention which is described with particularity in the appended claims.

What is claimed is:

1. Serial program step electronic accounting apparatus comprising:
   memory means for storing program instructions and object data,
   keyboard input means for entering alphabetic-type and numeric-type data into said memory means,
   control means for controlling the serial withdrawal of program instructions from said memory means,
   arithmetic processor means electrically coupled to said memory means and to said control means for processing object data in accordance with program instruction data,
   decoder means for generating logical control signals in response to each program instruction withdrawn from said memory means,
   keyboard entry logic means responsive to program instructions for designating the type and quantity of data which may be entered from said keyboard input means during the execution of one of a plurality of keyboard data entry instruction, and
   tally means operatively coupled to said keyboard entry means and said keyboard entry logic means to compare the type and quantity of data entered from said keyboard input means to that designated by said keyboard entry logic means.

2. The electronic apparatus defined in claim 1 wherein:
   said keyboard entry logic means comprises a plurality of bistable elements arranged in a counter configuration, and wherein
   said tally means comprises a decrementing means for modifying the count in said keyboard entry logic means in response to each legitimate keyboard entry during a keyboard data entry instruction.

3. Serial program step electronic accounting apparatus comprising:
   memory means for storing program instructions and object data,
   keyboard input means for entering alphabetic-type and numeric-type data into said memory means,
   control means for controlling the serial withdrawal of program instructions from said memory means,
   arithmetic processor means electrically coupled to said memory means and to said control means for processing object data in accordance with program instruction data,
   decoder means for generating logical control signals in response to each program instruction withdrawn from said memory means,
   input entry counter means responsive to programmed keyboard data entry instructions for generating logical control signals of predetermined duration corresponding to the duration of the logical control signals generated by said decoder means,
   logical gating means responsive to said input entry counter means for selectively passing keyboard-entered data signals in accordance with said input entry counter means logical control signals, and
   decrementing means operatively coupled to said keyboard input means and to said input entry counter means for modifying the count in said input entry counter means in response to each legitimate keyboard data entry during a keyboard data entry instruction.

4. The electronic accounting apparatus defined in claim 3 additionally including
   register means for temporarily storing alphabetic and numeric keyboard data signals entered during respective alphabetic and numeric keyboard data entry instructions, and
   decimal point key monitor means including a bistable element for monitoring the operation of a decimal point key of said keyboard entry means and for assembling numeric information in said register means in accordance with the state of said bistable element.

5. The electronic accounting apparatus defined in claim 3 additionally including
   decimal point monitor means for generating a first logical signal indicative that a decimal point key of said keyboard entry means has not been activated during the execution of a keyboard data entry instruction and a second logical signal indicative that the decimal point key has been activated during the execution of a keyboard data entry instruction, and wherein
   said logical gating means includes at least two separate AND gates, one of said AND gates being responsive to each of said first and second logical signals from said decimal point monitor means for coupling data signals from said keyboard entry means via an integer path when said first logical signal is true and via decimal path when said second logical signal is true.

6. The electronic accounting apparatus defined in claim 3 additionally including
   indicator means for alerting an operator to the occurrence of a keyboard entry error, and
   indicator gating means responsive to said input entry counter means and said keyboard entry means for activating said indicator means in response to an attempted manual keyboard entry of nondesignated data during the execution of a keyboard data entry program instruction.

7. The electronic accounting apparatus defined in claim 6 additionally including
   tally means operatively coupled to said keyboard entry means and said input entry counter means to compare the type and quantity of data entered from said keyboard input means to that designated by said keyboard entry logic means, and
   manually activated keyboard data entry error correction means responsive to said tally means to erase erroneous keyboard-entered data from said register means during the execution of a keyboard data entry instruction and for cancelling the modification of the count in said input entry counter means by the decrementing means.

References Cited

UNITED STATES PATENTS

| 3,368,205 | 2/1968 | Hunter et al. | 340—172.5 |
| 3,335,407 | 8/1967 | Lange et al. | 340—172.5 |
| 3,302,189 | 1/1967 | Korkowski et al. | 340—172.5 |
| 3,112,394 | 11/1963 | Close et al. | 340—172.5 |

GARETH D. SHAW, Primary Examiner